United States Patent

Anasenzl et al.

(10) Patent No.: US 10,077,082 B2
(45) Date of Patent: Sep. 18, 2018

(54) ALUMINIUM DIE-CAST PART

(71) Applicant: Bayerische Motoren Werke Aktiengesellschaft, Munich (DE)

(72) Inventors: Manuel Anasenzl, Mainburg (DE); Franz-Josef Klinkenberg, Ergolding (DE); Jean-Marc Segaud, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/939,509

(22) Filed: Nov. 12, 2015

(65) Prior Publication Data

US 2016/0059903 A1 Mar. 3, 2016

Related U.S. Application Data

(63) Continuation of application No. PCT/EP2014/067255, filed on Aug. 12, 2014.

(30) Foreign Application Priority Data

Sep. 5, 2013 (DE) .................. 10 2013 217 700

(51) Int. Cl.
*B62D 27/02* (2006.01)
*B62D 29/00* (2006.01)

(52) U.S. Cl.
CPC ......... *B62D 29/008* (2013.01); *B62D 27/026* (2013.01)

(58) Field of Classification Search
CPC .... B62D 29/00; B62D 29/007; B62D 29/008; B62D 27/026
See application file for complete search history.

(56) References Cited

U.S. PATENT DOCUMENTS

| | | | | |
|---|---|---|---|---|
| 5,456,517 | A * | 10/1995 | Kalian | B60G 15/068 164/47 |
| 8,020,927 | B2 * | 9/2011 | Schmidt | B62D 25/2018 296/203.03 |
| 9,550,534 | B2 * | 1/2017 | Lange | B62D 27/02 |

(Continued)

FOREIGN PATENT DOCUMENTS

| | | |
|---|---|---|
| CN | 102939466 A | 2/2013 |
| DE | 41 38 392 A1 | 6/1992 |

(Continued)

OTHER PUBLICATIONS

Computer translation of EP 2527232.*

(Continued)

*Primary Examiner* — Gregory A Blankenship

(74) *Attorney, Agent, or Firm* — Crowell & Moring LLP

(57) ABSTRACT

An aluminum diecast part is provided, in particular in the form of a load-bearing motor vehicle part. In order to protect against sudden breaking loads, at least one tension element, made of a material that can be deformed in a ductile manner and having a different thermal expansion coefficient to the die-cast part, is bonded, in a load-resistant manner to the side of the die-cast part that is external to the load. The die-cast part remains highly deformable, even under the effects of greater temperature fluctuations, by way of the punctiform, shear-resistant interconnection of the die-cast part and the tension element at multiple sites distributed over the bond.

11 Claims, 1 Drawing Sheet

(56) References Cited

U.S. PATENT DOCUMENTS

| | | | | |
|---|---|---|---|---|
| 9,616,937 B2* | 4/2017 | Sasaki | ............... | B62D 25/088 |
| 2010/0098969 A1* | 4/2010 | Hashimura | ........... | B21J 15/025 |
| | | | | 428/653 |
| 2011/0158741 A1* | 6/2011 | Knaebel | ............. | B62D 23/005 |
| | | | | 403/265 |
| 2013/0249250 A1* | 9/2013 | Ohhama | ............... | B62D 21/11 |
| | | | | 296/204 |
| 2014/0328614 A1* | 11/2014 | Fleischheuer | ......... | B60N 2/682 |
| | | | | 403/267 |
| 2015/0001885 A1* | 1/2015 | Saje | ................. | B62D 25/2009 |
| | | | | 296/193.07 |
| 2015/0225019 A1* | 8/2015 | Clausen | ............... | B62D 25/00 |
| | | | | 296/187.01 |
| 2016/0059903 A1* | 3/2016 | Anasenzl | ............ | B62D 29/008 |
| | | | | 296/187.01 |
| 2016/0347377 A1* | 12/2016 | Minei | ..................... | B29C 65/56 |
| 2016/0362144 A1* | 12/2016 | Potthast | ................ | B23K 31/02 |

FOREIGN PATENT DOCUMENTS

| | | |
|---|---|---|
| DE | 103 32 631 A1 | 3/2005 |
| DE | 103 55 913 A1 | 7/2005 |
| DE | 10 2005 050 963 A1 | 4/2007 |
| DE | 10 2011 076 426 A1 | 11/2012 |
| EP | 1 498 344 A2 | 1/2005 |
| EP | 2 527 232 A1 | 11/2012 |

OTHER PUBLICATIONS

International Search Report (PCT/ISA/210) issued in counterpart International Application No. PCT/EP2014/067255 dated Oct. 27, 2014, with English translation (Five (5) pages).
German Search Report issued in counterpart German Application No. 10 2013 217 700.3 dated Mar. 27, 2014, with English translation (Ten (10) pages).
Chinese-language Office Action issued in counterpart Chinese Application No. 201480034778.2 dated Sep. 19, 2016 with English translation (13 pages).
Zhou, "Key Problems and Application Studies of Lightweight Design of Body Structure made from Steel-Aluminum Composite Material", Doctoral Dissertation of South China University of Technology, Jun. 15, 2012 with partial English translation.
Chinese-language Office Action issued in counterpart Chinese Application No. 201480034778.2 dated Jun. 13, 2017 with English translation (Twelve (12) pages).
Chen Jianhong, "New Technology of Automobile Connection—Summary of 54th Annual Meeting of International Welding Society (1)", "Welding", Aug. 6, 2004, pp. 5, 6 and 9, Issue 3 in 2002, with partial English translation (Seven (7) pages).

\* cited by examiner

ALUMINIUM DIE-CAST PART

CROSS REFERENCE TO RELATED APPLICATIONS

This application is a continuation of PCT International Application No. PCT/EP2014/067255, filed Aug. 12, 2014, which claims priority under 35 U.S.C. § 119 from German Patent Application No. 10 2013 217 700.3, filed Sep. 5, 2013, the entire disclosures of which are herein expressly incorporated by reference.

BACKGROUND AND SUMMARY OF THE INVENTION

The invention relates to an aluminum die-cast part, in particular a structural component for a motor vehicle, in which, for protection against sudden breaking loads, at least one tension element made of a material which can undergo ductile deformation and which has a coefficient of thermal expansion different to the cast part is adhesively bonded in a load-resistant manner to that side of the cast part opposite the applied load.

DE 10 2011 076 426 A1 discloses an aluminum die-cast part of this type in the form of a spring support for a motor vehicle. The risk of the cast part breaking in the event of a crash is markedly reduced by the fact that, on that side of the cast part opposite the applied load, one or more tension strips made of a material which has high tensile strength and which can at the same time undergo ductile deformation are attached continuously over the entire length of the tensile strip by use of a viscoplastic adhesive bond so as to transfer loads and in particular shear loads. In this manner, the impact loads acting on the cast part are taken up by the tension strips on the side opposite the applied load such that, in the event of a crash, the cast part can deform largely without breaking. However, under operating conditions and especially under the effect of high temperature differences during curing of the adhesive system, the different coefficients of thermal expansion—inherent to the materials—lead to unequal changes in length between the cast part and the tension strips, which can impair the break-proof deformability of the crash-proof aluminum die-cast part.

The invention has the object of designing an aluminum die-cast part of the above-mentioned type such that the break-proof deformability of the cast part is retained unaltered even after relatively large temperature variations as can occur under extreme operating conditions or during heat curing of the adhesive system.

This and other objects are achieved according to the invention by providing an aluminum die-cast part in accordance with embodiments of the invention.

According to the invention, the tension element and the cast part are divided into individual partial sections which are each connected to one another in a shear-resistant manner at mutually separated fixing points. The partial sections counteract the respective differences in thermal expansion between the tension element and the cast part over a wide temperature range. Thus, the resulting shear stresses in the adhesive layer are kept within the permitted limit values. In this manner, thermally-induced delamination phenomena or crack formation within the adhesive bond are effectively prevented with low manufacturing cost, such that the cast part retains full functionality even after the effect of relatively large temperature variations of up to 200° C., for example during heat curing of the adhesive.

In a particularly preferred configuration of the invention, for reasons of simplified production, the aluminum cast part and the tension element are welded to one another at the mutual connection points or are secured in a form-fitting manner in the shear direction.

Extensive testing has shown multiphase steel, in particular of the type HC 600, to be a particularly advantageous material for the tension element, wherein this steel is expediently combined with a cast part made of an AlSi alloy.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1A, 1B:
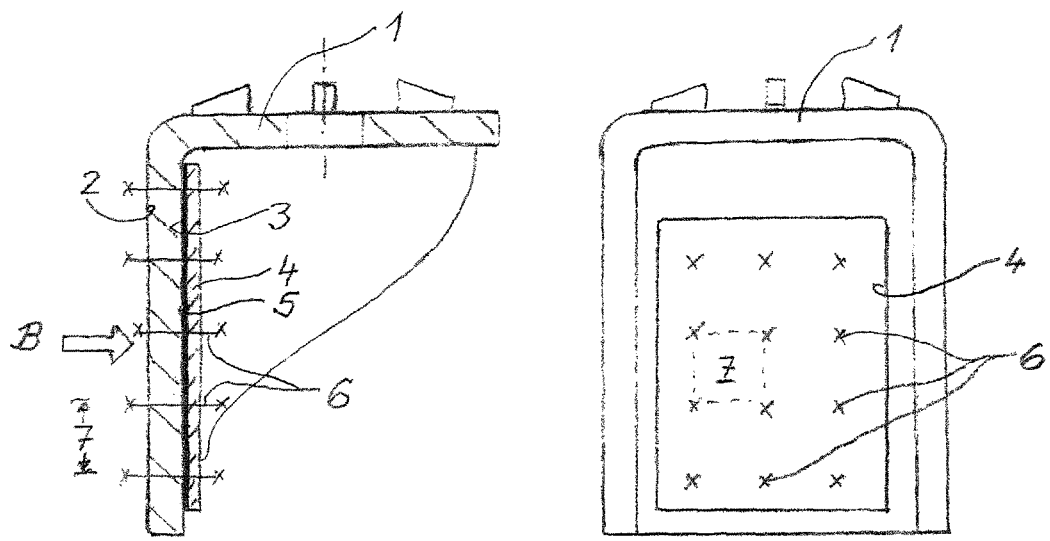
FIGS. 1A and 1B illustrate an exemplary aluminum die-cast part in the form of a motor vehicle spring support in cross-section in FIG. 1A and in a front view in FIG. 1B.

The aluminum die-cast part 1 represented in FIGS. 1A-1B in the form of a square-shaped support, is made of an AlSi alloy and is covered, on its outer side 3 opposite that side 2 which is loaded in the event of a crash, with one or more high-tensile strength tension elements 4. The high-tensile strength tension element 4 is made of a ductile multiphase steel plate of the type HC 600 which has a coefficient of thermal expansion different to that of the cast part 1 and is bonded in a load-resistant manner over its entire surface area to the cast part 1 by use of a viscoplastic adhesive bond 5, e.g. consisting of a structural adhesive.

Whereas a conventional aluminum die-cast support has high material brittleness, and thus under the effect of a concentrated sudden increase in load B can break after a small bending deformation, the crash behavior of the aluminum cast part 1 in conjunction with the tension element 4 adhesively bonded thereto is improved to the point that it can be bent, without cracking and without breaking, to a very high degree of deformation.

Under the effect of temperature variations, such as can arise under weather-dependent operating conditions or during the curing process of the adhesive system in the cooling phase, however, the differing coefficients of thermal expansion which are inherent to the materials lead to different thermal expansions between the cast part 1 and the tension element 4. These can be so large that the resulting shear stress in the adhesive bond 5 is beyond the permitted limit value.

This is prevented here in that the cast part 1 and the tension element 4 are divided into individual partial sections 7, of identical shape, by fixing points 6 connecting these to one another in a shear-resistant manner. The shear-resistant connection points 6 counteract the thermal expansion differences between the cast part 1 and tension element 4 arising in the respective partial section 7, and thus the adhesive bond 5 is not subjected to excessive shear stresses. This ensures that, under the effect of external temperature differences, delamination phenomena and/or crack formation within the adhesive bond 5 are effectively prevented, such that the cast part 1 designed in this manner remains fully functional in the event of a crash.

Figures 2A, 2B, 2C:
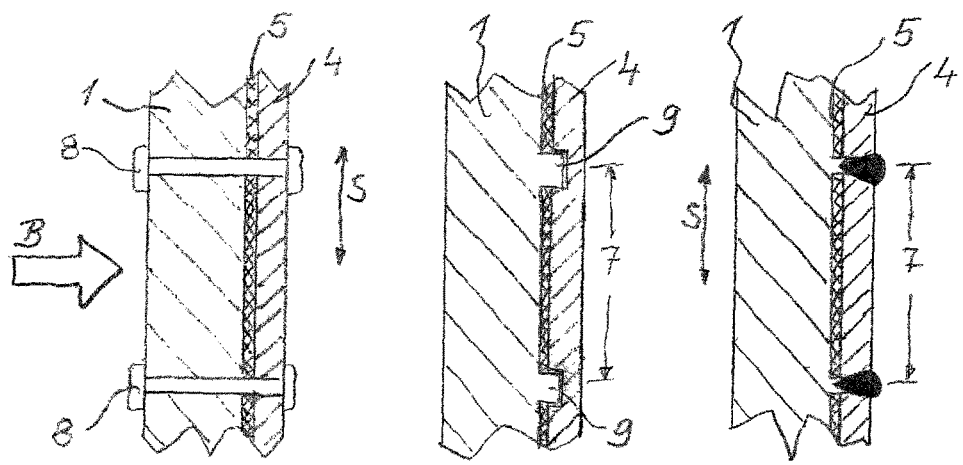
FIGS. 2A-2C are enlarged partial representations of the aluminum die-cast part shown in FIG. 1, with shear-resistant connection points of different designs, respectively in the form of a riveted or bolted connection in FIG. 2A, a form-fitting connection in FIG. 2B or a welded connection in FIG. 2C.

FIGS. 2A-2C show multiple embodiment possibilities for the design of the shear-resistant connection points 6. Thus, the cast part 1 and the tension element 4 shown in FIG. 2A are coupled to one another by way of riveted or bolted connections 8 and in FIG. 2B the connection points 6 are form-fitting connections 9 effective in the shear direction S, while in FIG. 2C spot-welded connections 10 are provided at the spacing of the connection points 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An aluminum die-cast part, comprising:
   a cast part having a first side to which a load can be applied;
   at least one tension element adhesively bonded in a load-resistant manner to an opposite side of the cast part to which the load can be applied, wherein
   the tension element is made of a material that undergoes ductile deformation when the load is applied and has a coefficient of thermal expansion different to that of the cast part, and
   the tension element and the cast part are connected to one another in a punctiform shear-resistant manner at multiple locations distributed over the adhesive bond between the cast part and the tension element, wherein
   wherein the multiple locations define a grid pattern distributed over the adhesive bond.

2. The aluminum die-cast part according to claim 1, further comprising spot-welds connecting the adhesively bonded cast part and tension element.

3. The aluminum die-cast part according to claim 1, wherein mutually separated form-fit elements connect the tension element and the cast part to one another in the shear-resistant manner.

4. The aluminum die-cast part according to claim 1, wherein the tension element is made of a multi-phase steel.

5. The aluminum die-cast part according to claim 4, wherein the multi-phase steel is HC 600.

6. The aluminum die-cast part according to claim 4, wherein the cast part is made of an AlSi alloy.

7. The aluminum die-cast part according to claim 5, wherein the cast part is made of an AlSi alloy.

8. The aluminum die-cast part according to claim 1, wherein the cast part is made of an AlSi alloy.

9. The aluminum die-cast part according to claim 1, wherein the aluminum die-cast part is a vehicle structural component.

10. A load-bearing motor vehicle component, comprising:
    an aluminum die-cast part having a first thermal expansion coefficient;
    at least one tension element made of a ductile deformable material, the tension element having a second thermal expansion component different from the first thermal expansion component of the die-cast part, wherein
    the tension element is bonded in a load-resistant manner to a side of the die-cast part that is opposite to a load applied to the die-cast part in order to protect against a sudden breaking load, and
    punctiform, shear-resistant interconnections of the die-cast part and the tension element are provided at multiple sites distributed over the bond, whereby the die-cast part remains deformable even under effects of greater temperature fluctuations, wherein
    the multiple sites define a grid pattern distributed over the bond.

11. The aluminum die-cast part according to claim 10, wherein the multiple locations define vertices of a grid that divide the cast part and the at least one tension element into individual partial sections of identical shape.

* * * * *